(12) United States Patent
Uhm

(10) Patent No.: US 10,293,236 B2
(45) Date of Patent: May 21, 2019

(54) DIRECTION INDICATION DEVICE FOR GOLF PUTTING

(71) Applicant: Hyun Duk Uhm, Seoul (KR)

(72) Inventor: Hyun Duk Uhm, Seoul (KR)

(73) Assignees: Kyeong Seok Um, Seoul (KR); KAISHOT CO., LTD., Seoul (KR)

(*) Notice: Subject to any disclaimer, the term of this patent is extended or adjusted under 35 U.S.C. 154(b) by 0 days.

(21) Appl. No.: 16/115,876

(22) Filed: Aug. 29, 2018

(65) Prior Publication Data
US 2018/0369676 A1   Dec. 27, 2018

Related U.S. Application Data

(63) Continuation of application No. PCT/KR2017/001946, filed on Feb. 22, 2017.

(30) Foreign Application Priority Data

Feb. 29, 2016 (KR) .................. 10-2016-0024422

(51) Int. Cl.
*A63B 69/36* (2006.01)
*A63B 71/06* (2006.01)
(Continued)

(52) U.S. Cl.
CPC ...... *A63B 69/3676* (2013.01); *A63B 71/0622* (2013.01); *G01B 5/24* (2013.01); *A63B 2102/32* (2015.10); *A63B 2220/18* (2013.01)

(58) Field of Classification Search
CPC ........ A63B 69/3676; A63B 2071/0602; A63B 2220/18; G01C 9/12; G01B 5/24
See application file for complete search history.

(56) References Cited

U.S. PATENT DOCUMENTS 994,521 A * 6/1911 Jacobs .................... G01C 9/12
                                                33/283
2,859,725 A * 11/1958 Genasci .................. G01C 9/12
                                                116/215
(Continued)

FOREIGN PATENT DOCUMENTS

JP      2012-202849 A     10/2012
KR      20-0413352         4/2006
(Continued)

*Primary Examiner* — Steven B Wong
(74) *Attorney, Agent, or Firm* — Reinhart Boerner Van Deuren P.C.

(57) ABSTRACT

Disclosed herein is a direction indication device for golf putting. The device includes a scale plate, a left and right slope angle indication needle, an indication needle rotation means, a vertical slope angle scale means, and a lid provided over the scale plate. The indication needle rotation means includes a first rotation cam including a wedge pin closely coupled vertically to an elongated hole formed on one end of the left and right slope angle indication needle and maintained vertically in a direction of the central axis of the earth. The indication needle rotation means also includes an angle adjustment bar rotatably connected with the first rotation cam such that the first rotation cam is rotated from side to side and moves back and forth. Additionally, the indication needle rotation means includes a first supporting rod to support the angle adjustment bar and installed on the scale plate.

7 Claims, 7 Drawing Sheets

(51) Int. Cl.
*G01B 5/24* (2006.01)
*A63B 102/32* (2015.01)

(56) References Cited

U.S. PATENT DOCUMENTS

| | | | | | |
|---|---|---|---|---|---|
| 3,293,755 | A | * | 12/1966 | Cronwell | A63B 57/00 |
| | | | | | 33/228 |
| 4,260,151 | A | * | 4/1981 | Weaver | A63B 69/3676 |
| | | | | | 473/404 |
| 4,864,854 | A | * | 9/1989 | vanLeemput | G01P 5/02 |
| | | | | | 73/170.07 |
| 5,038,489 | A | * | 8/1991 | Muehlenbein | A61B 5/1071 |
| | | | | | 33/1 BB |
| 5,492,322 | A | * | 2/1996 | Smith | A63B 69/3676 |
| | | | | | 33/379 |
| 5,520,384 | A | * | 5/1996 | Wetzel | A63B 69/3676 |
| | | | | | 33/392 |
| 5,662,535 | A | * | 9/1997 | Smith | A63B 69/3676 |
| | | | | | 33/385 |
| 5,792,015 | A | * | 8/1998 | Hoyt | G01C 9/12 |
| | | | | | 33/391 |
| 2006/0073916 | A1 | * | 4/2006 | Lin | A63B 57/00 |
| | | | | | 473/404 |

FOREIGN PATENT DOCUMENTS

| | | |
|---|---|---|
| KR | 10-1116149 B1 | 3/2012 |
| KR | 10-2012-0074991 A | 7/2012 |
| KR | 10-1484550 B1 | 1/2015 |

* cited by examiner

DIRECTION INDICATION DEVICE FOR GOLF PUTTING

CROSS REFERENCE TO RELATED APPLICATIONS

The present application claims priority to International Application No. PCT/KR2017/001946, filed Feb. 22, 2017, which claims priority to Korean Patent Application No. 10-2016-0024422, filed Feb. 29, 2016, the entire contents of which is incorporated herein for all purposes by this reference.

TECHNICAL FIELD

The present invention relates to a direction indication device for golf putting and, more particularly, to a physical conversion device capable of visually displaying a slope angle of an inclined plane between a position of a golf ball placed on a putting green of a golf course and a hole cup.

BACKGROUND ART

In general, a putting motion in golf is mainly performed at a final stage of inserting a golf ball into a hole cup and, therefore, one of motions requiring high concentration and precise directivity taking consideration of an inclined plane of a putting green.

Meanwhile, since a putting green of a golf course is designed with inclined planes in a variety of shapes around the hole cup, it is absolutely necessary for a golfer to accurately read a slope between a position where the golf ball is placed and the hole cup at the time of putting, thereby enhancing a success rate of the putting. However, most golfers are not able to read the slope of the putting green, thereby experiencing difficulty in putting.

There are many products and patents that indicate a golf putting direction as an auxiliary means to overcome the difficulties in putting as described above, thereby improving the accuracy of the putting. However, there is a problem that the accuracy of the putting is decreased due to a mismatch between the direction indicated by each product according to the conventional art and the center location and directivity of the golf ball.

Meanwhile, as a means for solving the above-mentioned problems, a technique of using a spirit level is disclosed, wherein the spirit level measures the slope using a movement of a bubble forced to be formed after filling a transparent cylindrical container with a liquid.

However, in the case of using the above-described spirit level using the bubble, the vertex of a tilt can be identified because of the cylindrical spirit level, but there is a problem that it is difficult to identify the tilted angle and direction. Particularly, since the bubble of the above-mentioned spirit level moves only in an upward direction, it is not possible to identify the degree of the angle that the bubble is tilted at by exactly measuring the bubble by a scale, even if there is a movement of the bubble. Accordingly, there is a problem that it is not possible to identify exact degrees of the angle, thereby allowing a slope to be only approximately identified.

In addition, in the conventional art, there is a case in which a spirit level is attached to a putter. In this case, however, there is a problem that attaching the spirit level to the putter is onerous and measuring a slope in a direction in which the ball is to be sent is complicated. That is, when the spirit level is attached to the putter, it not only violates golf rules but also makes the putter difficult to be in surface contact with the putting green, and there is a problem in that the slope of the putting green can be measured only by moving the putter in every direction.

In addition, in the conventional art, an electronic putting slope measurement device is in circulation. However, a digital technique indicating putting slope and vertical slope allows the golfer to read an indication that is a digitized slope angle of the product, and to recognize only the figure of the slope angle in golfer's mind. It may be possible for the golfer to putt the golf ball roughly toward an inclined plane while drawing the angle of the slope of the golf ball in his or her mind, wherein the angle of the slope of the golf ball is taken by eye with the actual hole cup direction as the reference line, thereby causing a difficult problem of letting the golf ball set at an exact slope angle for performing the putting.

In addition, in the conventional art, the gears of the direction indication needle and the gears of the direction converter are engaged with each other and the magnification of the direction angle is determined by the ratio of the gears, respectively, whereby the accuracy of the angle of the putting direction is maintained. However, because a structure of the saw-toothed gears like these is formed to be very small, a dislocation between the gears occurs even in a small external impact, thereby causing a problem that a new alignment is required every time.

DOCUMENTS OF RELATED ART

Korean Patent No. 10-1484550 (Publication date: Jan. 14, 2015)

Korean Utility Model Registration No. 20-0413352 (Publication date: Apr. 10, 2006)

BRIEF SUMMARY OF THE DISCLOSURE

The present invention has been made to solve the above problems. More particularly, an object of the present invention is to provide a direction indication device for golf putting, wherein the direction indication device may estimate an exact putting direction by allowing an indication of the putting angle and putting direction to be established by taking the slope into consideration by measuring a left and right slope between a position a golf ball placed on a putting green and a position a hole cup is located.

In addition, another object of the present invention is to provide a vertical slope between a position of a golf ball placed on a putting green and a position of a hole cup, whereby an accuracy of putting can be enhanced by estimating a force adjustment when putting upward or downward, and errors in putting are eliminated by precisely recognizing up-and-down directions in an optical illusion region.

The present invention provides a direction indication device for golf putting, the device including: a scale plate provided with a hole cup aiming reference line serving as a reference when aiming at a hole cup, a left and right slope angle indication scale indicating a range of left and right slope angles, and a hole in its center; a left and right slope angle indication needle folitLed in a direction indication needle shape to indicate a direction by combining with the hole; an indication needle rotation means allowing the left and right slope angle indication needle to rotate to indicate the left and right slope angle indication scale; a vertical slope angle scale means provided on the scale plate to indicate a vertical slope angle of a putting green; and a lid provided over the scale plate, wherein the indication needle rotation means includes: a first rotation cam including a wedge pin closely coupled vertically to an elongated hole folioed on one end of the left and right slope angle indication needle and maintained vertically in a direction of the central axis of the earth; an angle adjustment bar rotatably connected with the first rotation cam such that the first rotation cam is rotated from side to side and moves back and forth; and a first supporting rod to support the angle adjustment bar and installed on the scale plate.

Preferably, the left and right slope angle indication needle further includes position identification scale marked to allow a distance between the center of the scale plate and the first rotation cam adjusted by the angle adjustment bar to be identified.

Preferably, the wedge pin is formed in a shape of a circular sphere at an end thereof and allows the left and right slope angle indication needle to move without clearance by being brought into close contact with the elongated hole formed on one side of the left and right slope angle indication needle when the first rotation cam rotates from side to side.

Preferably, the angle adjustment bar further includes a handle at one end thereof to move the angle adjustment bar back and forth.

Preferably, the vertical slope angle scale means further includes: a second rotation cam rotatable up-and-down and maintained vertically in the direction of the central axis of the earth; and a second supporting rod to support the second rotation cam and having a mark showing a vertical slope angle reference line.

Preferably, the second rotation cam further includes a vertical slope angle indication scale indicating a vertical slope angle on a circumferential surface of an upper circular arc thereof.

Preferably, the lid is made of a transparent material to allow the scale plate to be visually confirmed.

The direction indication device for golf putting according to the present invention reveals an effect that accurate putting can be achieved as follows. When a golf ball is seated on a putting green, the direction indication device for golf putting as a substitute for a marker is aligned with a hole cup aiming reference line to the center of the hole cup, and the line of the golf ball is aimed at the direction indicated by the left and right slope angle indication needle in a straight line. After removing the direction indication device for golf putting, the golf ball is putted in the direction of the line of the golf ball, whereby the golf ball forms a constant curve along the inclined plane and approaches the hole cup.

In addition, the vertical slope angle scale means used for confirming whether the golf ball is seated higher or lower than the position of the hole cup can identify the vertical slope angle of the corresponding golf ball spot using the fact that the second rotation cam 410 rotates in a direction to be normally vertically maintained.

That is, the technique according to the present invention allows the putting direction to be indicated while the slope angle of any inclined plane irrespective of the vertical, or left and right inclined plane to be accurately displayed, thereby making it possible to perform accurate putting considering the slope angle corresponding to the inclined plane of the putting green.

DETAILED DESCRIPTION

A specific structure or functional descriptions presented in an embodiment of the present invention are merely illustrative for the purpose of describing the embodiment according to the concept of the present invention, and embodiments according to the concept of the present invention can be implemented in various forms. In addition, the present invention should not be construed as limited to the embodiments set forth herein, but should be understood to include all modifications, equivalents, or alternatives falling within the spirit and scope of the present invention.

Hereinafter, preferred embodiments of a direction indication device for golf putting according to the present invention will be described in detail with reference to the accompanying drawings.

Figure 1:
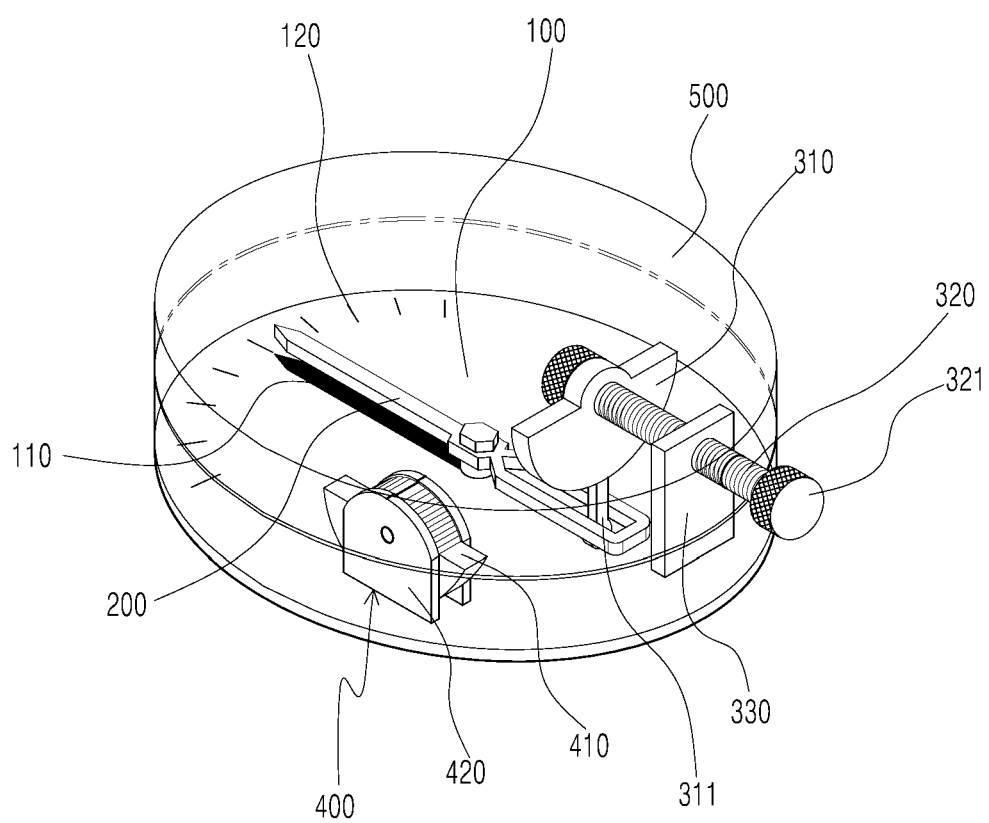
FIG. 1 is a perspective view of a direction indication device for golf putting of the present invention.
Figure 2:
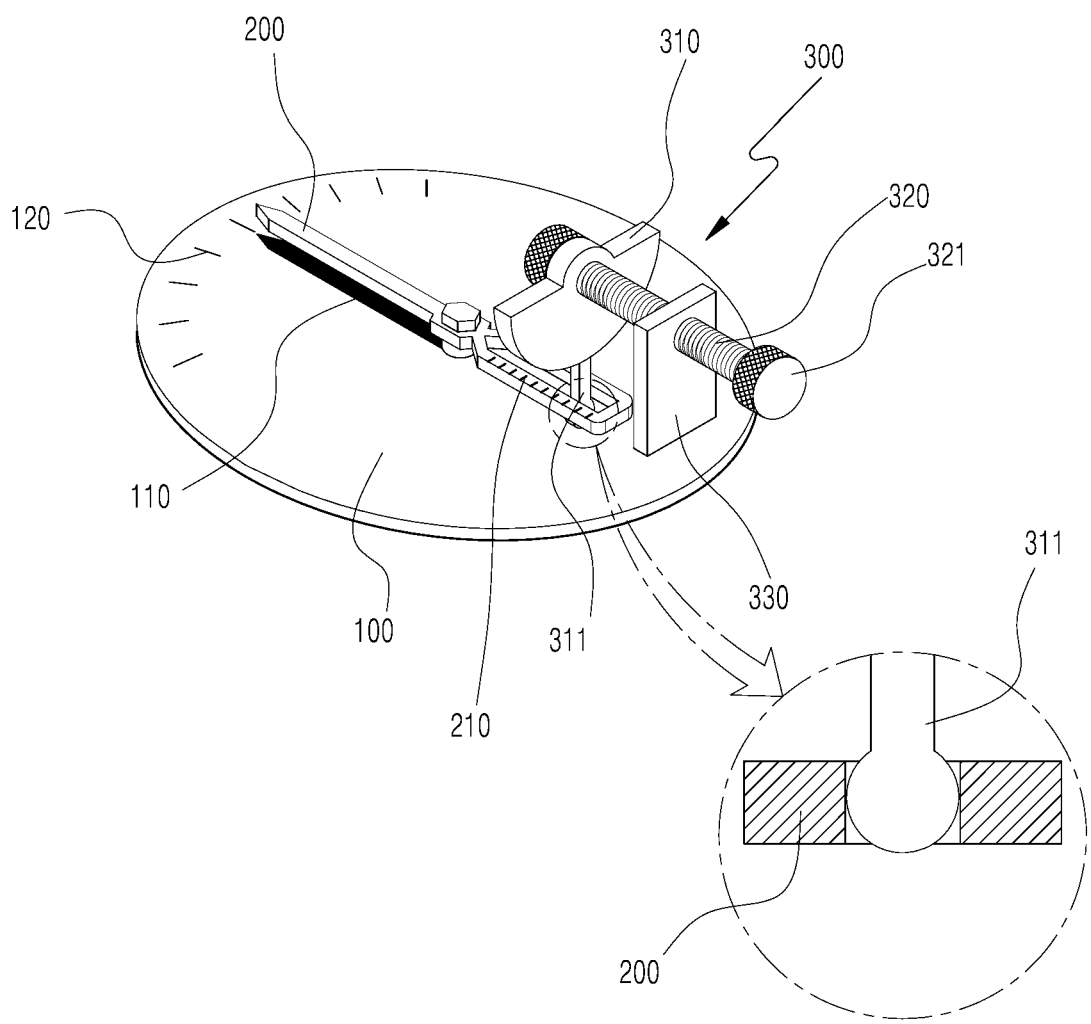
FIG. 2 is a partial perspective view of a direction indication device for golf putting of the present invention.
Figure 3:
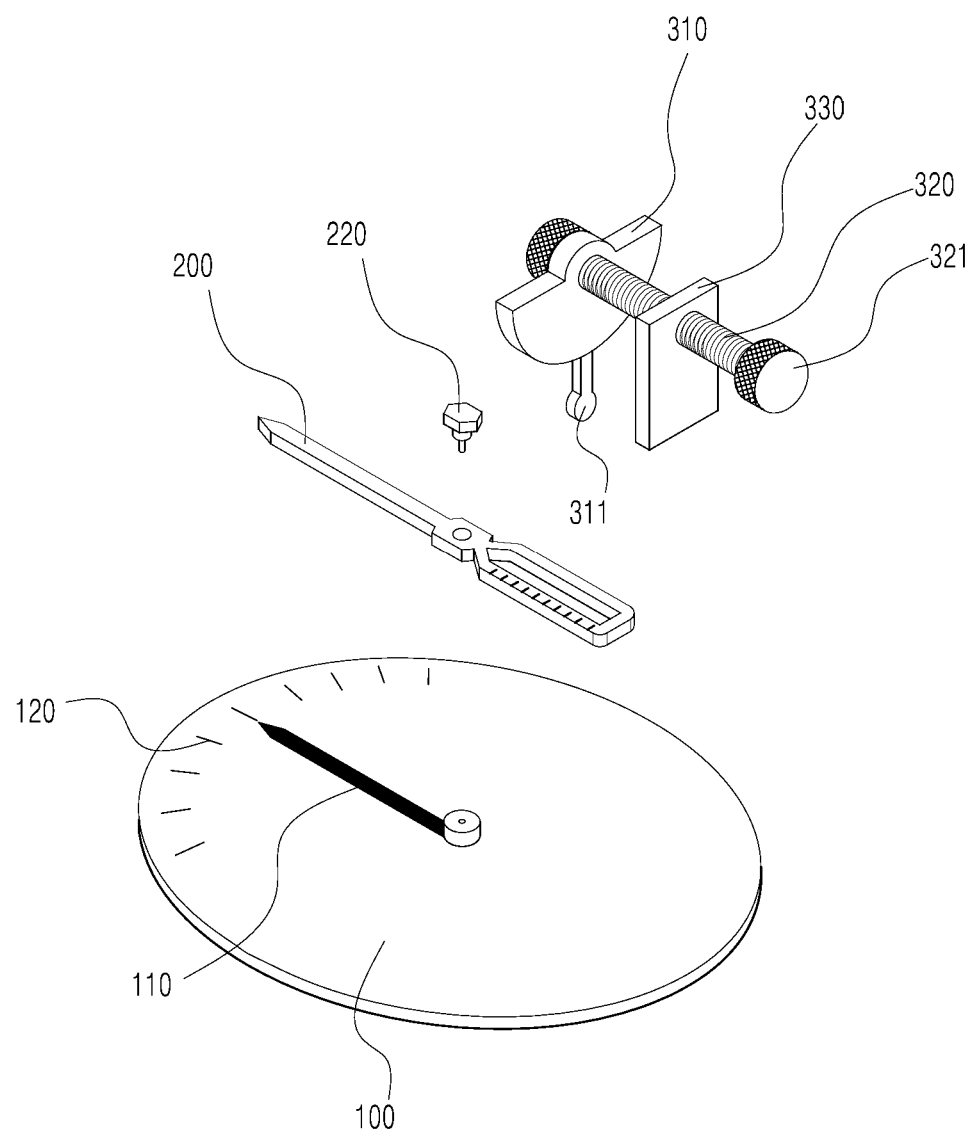
FIG. 3 is an exploded view of FIG. 2.
Figure 4:
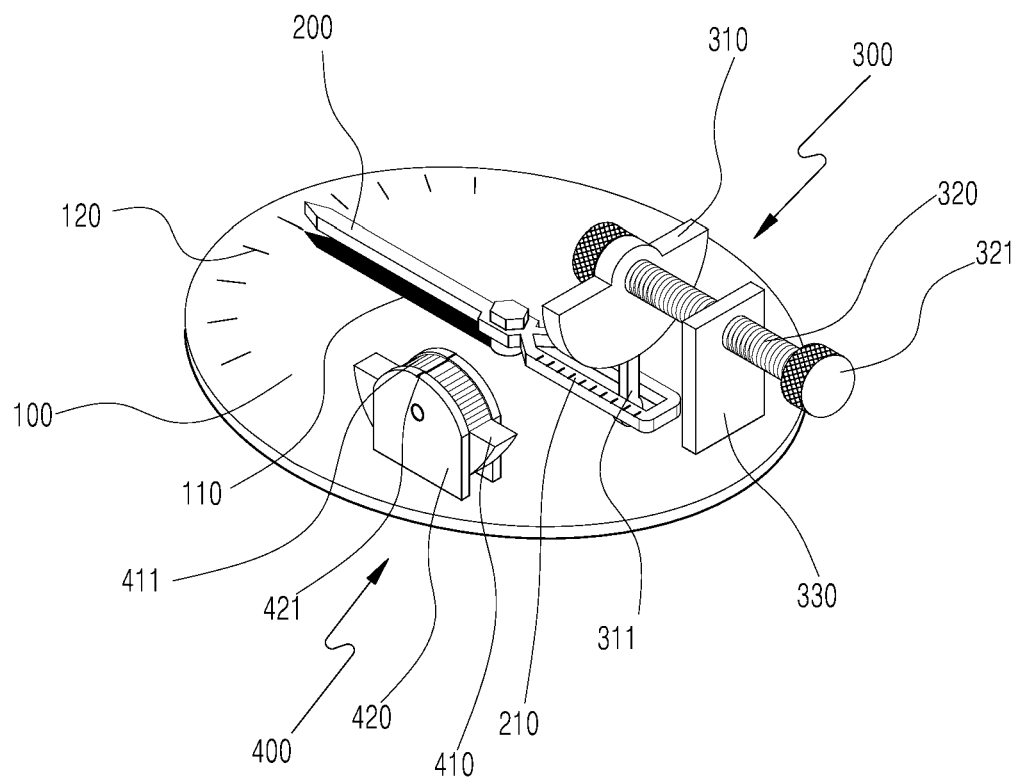
FIG. 4 is a perspective view showing a FIG. 2 with a vertical slope angle scale means added thereto.
Figure 4:
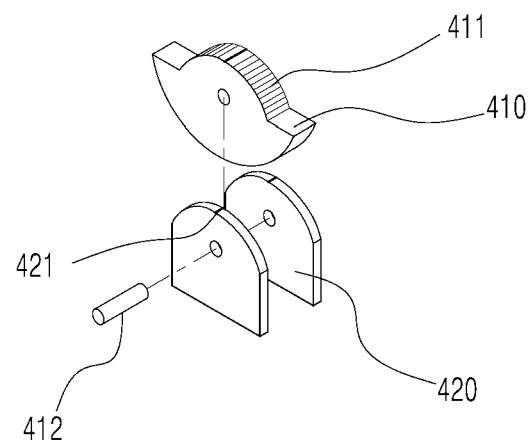
Figure 5:
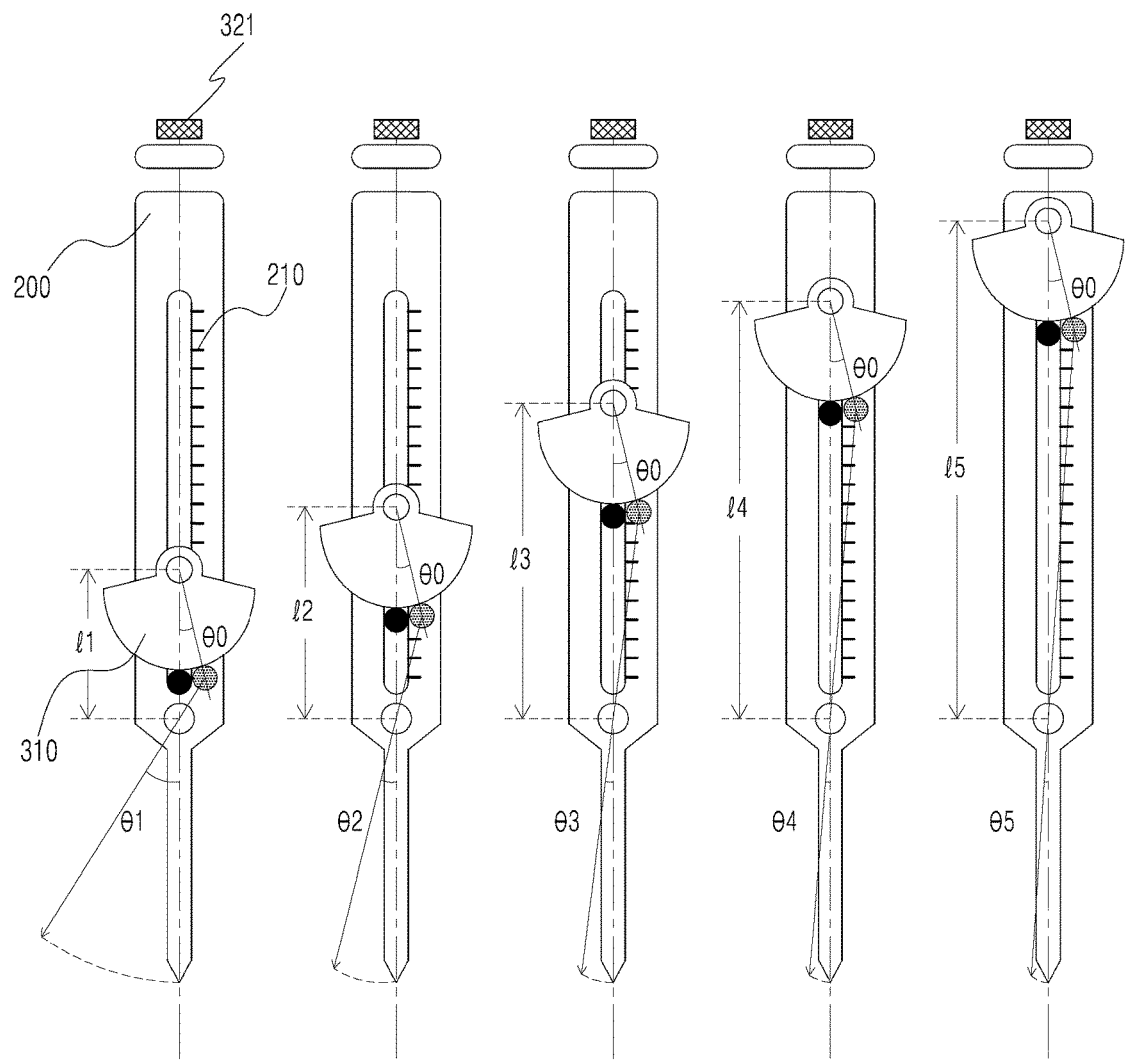
FIG. 5 represents top plan views of FIG. 2.
Figure 6A:
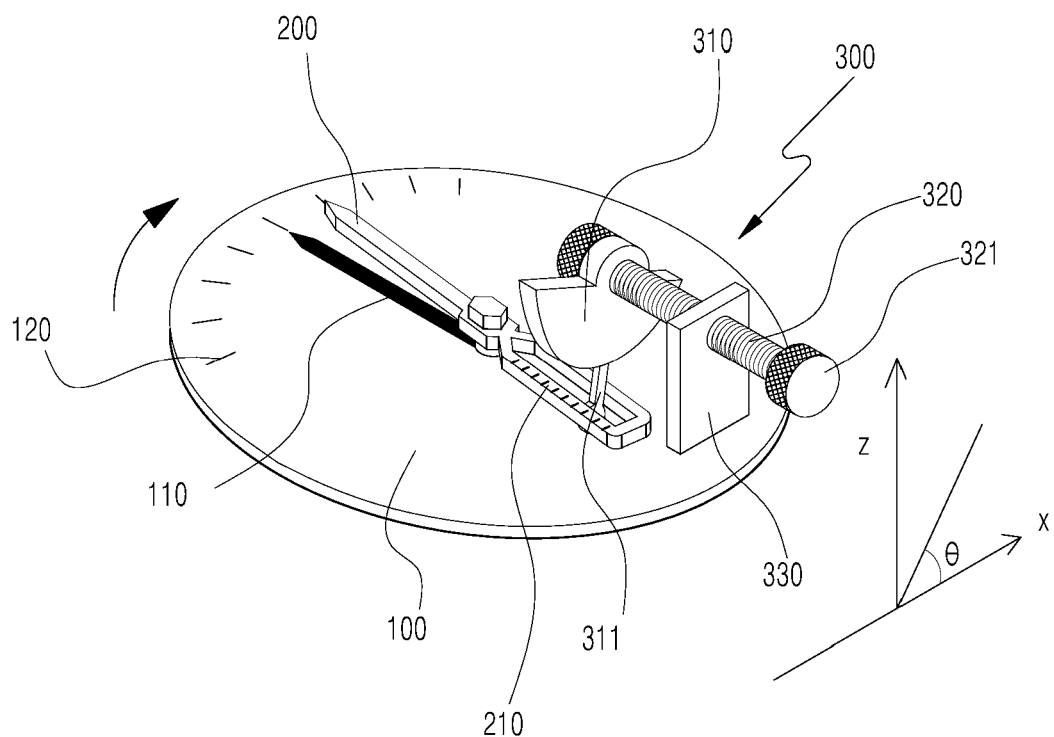
FIGS. 6a and 6b are working drawings each according to a left and right slope of a left and right slope angle indication needle constituting the direction indication device for golf putting of the present invention.
Figure 6B:
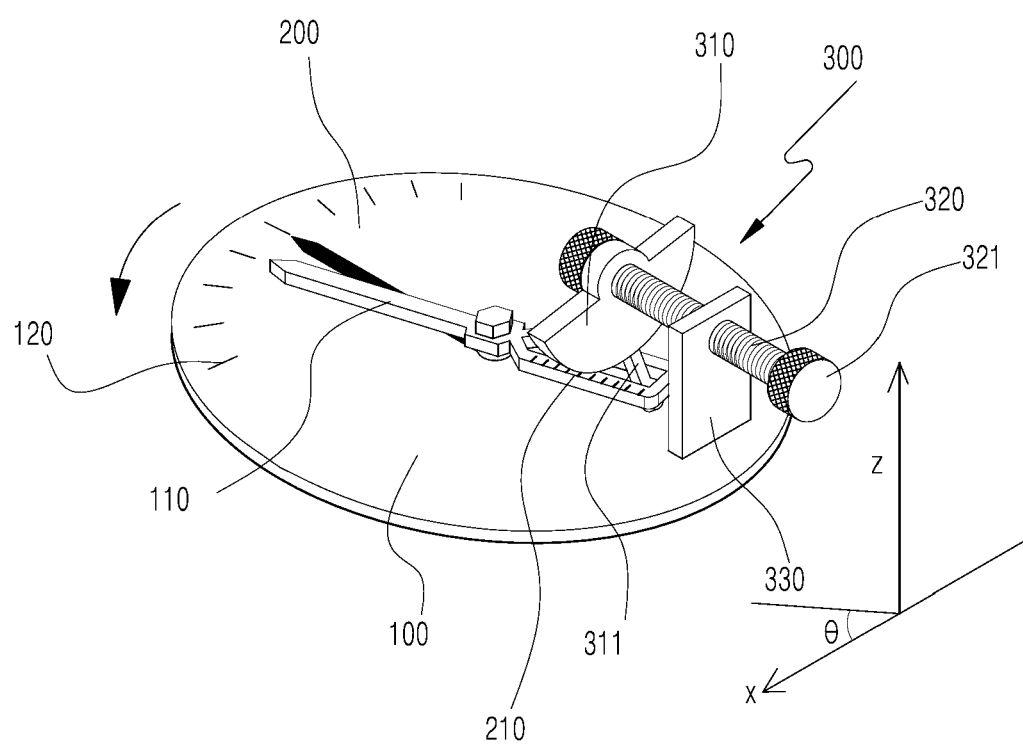

FIG. 1 is a perspective view of a direction indication device for golf putting of the present invention, FIG. 2 is a partial perspective view of a direction indication device for golf putting of the present invention, FIG. 3 is an exploded view of FIG. 2, FIG. 4 is a perspective view showing a FIG. 2 with a vertical slope angle scale means added thereto, FIG. 5 represents top plan views of FIG. 2, and FIGS. 6a and 6b are each working drawings according to a left and right slope of a corresponding left and right slope angle indication needle constituting the direction indication device for golf putting of the present invention.

As shown in FIG. 1, the direction indication device for golf putting of the present invention includes: a scale plate 100 composed of a disc-shape plate with a predetermined thickness to provide a left and right slope angle indication scale 120 indicating a range of left and right slope angles in a shape of a semicircular arc and displayed on one side thereof, and a hole cup aiming reference line 110 serving as a reference when aiming at a hole cup to place the direction indication device for golf putting in a straight line to the hole cup at a position the golf ball is seated on a putting green and marked on a center of the left and right slope angle indication scale 120; a left and right slope angle indication needle 200 formed with an arrow in a direction indicator shape on one side thereof and an elongated hole on the opposite side thereof, rotated from side to side by an indication needle rotation means 300, and rotatably connected to the center of the scale plate 100; the indication needle rotation means 300 allowing the left and right slope angle indication needle 200 to rotate to indicate the left and right slope angle indication scale 120; a vertical slope angle scale means 400 provided on the scale plate 100 to indicate the vertical slope angle of the putting green; and a lid 500 provided over the scale plate 100, wherein the indication needle rotation means 300 includes: a first rotation cam 310 formed with a wedge pin 311 coupled vertically to the elongated hole and having an end in a shape of a circular sphere, and composed of a lower part heavier than the central part of an axis thereof, thereby being maintained always vertically in the direction of the central axis of the earth by gravity; an angle adjustment bar 320 rotatably connected with the first rotation cam 310 such that the first rotation cam is rotated from side to side and moves back and forth and shaped in a screw thread or bar; and a first supporting rod 330 installed on the scale plate 100, and coupled with and supporting the angle adjustment bar 320 by being penetrated through the side surface thereof.

The vertical slope angle scale means 400 is composed of: a second rotation cam 410 rotatably coupled with one side of the scale plate 100, having a center of rotation thereof tilted downward, and including a vertical slope angle indication scale 411 indicating a vertical slope angle on a circumferential surface of an upper circular arc thereof; and a second supporting rod 420 coupled with a second rotation pin 412 serving as a rotation axis at a side surface of the second rotation cam 410 to support the second rotation cam 410.

The lid 500 is composed of a transparent window larger than the scale plate 100, thereby allowing a user to visually check the left and right as well as vertical slope angles with respect to a position the golf ball is seated on the putting green and protecting the direction indication device for golf putting against internal damage due to external impact.

In addition, a handle 321 protrudes to an outside of the lid 500, thereby allowing the user to easily manipulate the angle adjustment bar 320.

FIGS. 2 to 3 are views showing the left and right slope angle indication needle 200 coupled with the scale plate 100 and a combination relation between the indication needle rotation means 300 and the left and right slope angle indication needle 200, wherein the left and right slope angle indication needle 200 is rotatably coupled to the center of the scale plate 100 by a first rotation pin 220 serving as a rotation axis at the center of the scale plate 100.

The wedge pin 311 foamed at the lower end of the first rotation cam 310 is brought into close contact with the elongated hole formed at one side of the left and right slope angle indication needle 200 and moves the left and right slope angle indication needle 200 according to the movement of the first rotation cam 310, wherein the wedge pin 311 is formed in a shape of a circular sphere, thereby allowing the left and right slope angle indication needle 200 to move without clearance by being brought into close contact with the elongated hole formed on one side of the left and right slope angle indication needle 200 when the first rotation cam 310 rotates from side to side.

Position identification scale 210 allowing the distance between the center of the scale plate 100 and the wedge pin 311 to be identified are marked around the periphery of the elongated hole of the left and right slope angle indication needle 200, and the first rotation cam 310 is allowed to move back and forth through the manipulation of the angle adjustment bar 320.

The angle adjustment bar 320 is formed in the shape of the screw thread or bar, engaged with the first supporting rod 330, and provided with the handle 321 at one end thereof. Accordingly, the first rotation cam 310 connected to the angle adjustment bar 320 can be moved back and forth by rotating the handle 321 clockwise or counterclockwise. However, the thread formation of the angle adjustment bar 320 is just one of methods allowing the first rotation cam 310 to move, and the methods are not limited to the thread formation. Accordingly, the user may move the angle adjustment bar 320 back and forth by applying an arbitrary force. Furthermore, the angle adjustment bar 320 may be moved in various ways.

FIG. 4 is a perspective view of the scale plate 100 and the vertical slope angle scale means 400 additionally added thereto composing the direction indication device for golf putting according to the present invention.

The second supporting rod 420 having upper part shaped like the circumferential surface of the upper circular arc of the second rotation cam 410 and formed with two plates is installed on opposite sides of the second rotation cam 410 to support the second rotation cam 410. In addition, the second rotation pin 412 is coupled to the second supporting rod 420 and the second rotation cam 410 by penetrating through the side surfaces thereof, thereby allowing the second rotation cam 410 to be rotatable vertically.

In addition, a vertical slope angle reference line 421 serving as reference of the vertical slope angle is marked on the upper part of the second supporting rod 420, whereby the vertical slope angle of the position where the golf ball seated on the putting green is located can be identified.

More specifically, the vertical slope angle scale means 400 is to measure the vertical slope angle of the spot where the golf ball seated on the putting green is located. When the hole cup is in a direction higher or lower than the position of the golf ball, the second rotation cam 410 rotates to a center of gravity due to gravity.

At this time, the vertical slope angle indication scale 411 corresponding to the vertical slope angle reference line 421 is a vertical slope to be measured.

FIG. 5 represents top plan views of FIG. 2 and illustrates a correlation between the movement of the first rotation cam 310 and rotation angles of the left and right slope angle indication needle 200 according to the movement of the angle adjustment bar 320.

As illustrated in FIG. 5, with the first rotation cam 310 assumed being rotated at a certain angle, as the wedge pin 311 formed at the lower end of the first rotation cam 310 approaches closer toward the first rotation pin 220 by being in close contact with the elongated hole formed on one side of the left and right slope angle indication needle 200, the rotation angle of the left and right slope angle indication needle 200 becomes larger.

The operating relationship of the direction indication device for golf putting of the present invention composed as described above will be described in detail as follows.

When the direction indication device for golf putting is positioned as a substitute for the marker behind the golf ball seated on the putting green, while tilting to the left or right, the first rotation cam 310 rotates by the left and right inclined planes of the putting green. With the first rotation cam 310 rotated to the left or right, the left and right slope angle indication needle 200 vertically engaged with the wedge pin 311 of the first rotation cam 310 is rotated horizontally in a direction opposite to the direction the first rotation cam 310 is tilted to. At this time, the left and right slope angle indication needle 200 rotates in proportion to the tilted angle of the inclined plane and indicates the left and right slope angle indication scale 120 on the scale plate 100.

To describe as an example, when the direction indication device for golf putting is directed to the hole cup in FIG. 6a, a case is assumed that the slope of the putting green is configured to be downward towards the left side from the right side, that is, the slope is configured to have the right side higher than the left side. Provided the direction indication device for golf putting according to the present invention is positioned at the rear end of the golf ball as a substitute for the marker when the golf ball is seated on the putting green, the direction indication device for golf putting is placed in a state tilted to the left side. At this time, the first rotation cam 310 is tilted to the right in a direction to be kept vertically at all times in the direction of central axis of the earth by gravity, and the wedge pin 311 at the lower end of the first rotation cam 310, vertically engaged and brought into close contact with the elongated hole of the left and right slope angle indication needle 200, rotates the elongated hole side to the left, thereby letting the arrow of the direction indicator shape in the opposite side indicate the direction in the right side.

That is, the golfer can recognize that the inclined plane is configured to have the right side higher than the left side when the left and right slope angle indication needle 200 points to the right side, and accurately identify the slope angle of the right side of the inclined plane at the same time. On the contrary, when the left and right slope angle indication needle 200 points to the left side, the golfer can recognize that the inclined plane is configured to have the left side higher than the right side and accurately identify the slope angle of the left side of the inclined plane at the same time. Accordingly, removing the direction indication device for golf putting as a substitute for the marker after aligning the line of the golf ball with the direction indicated by the left and right slope angle indication needle 200, the golfer merely needs to perform putting to the direction of the line of the golf ball.

In addition, as described above, the vertical slope angle scale means 400 can display the vertical slope angle of the corresponding golf ball spot located on the putting green using the fact that the second rotation cam 410 rotates in a direction to be normally vertically maintained.

The present invention described above is not limited to the aforementioned embodiments and accompanying drawings. In addition, it will be apparent to those having ordinary knowledge in the art that various modifications and variations can be made in the present invention without departing from the spirit or scope of the general inventive concept as defined by the appended claims.

DESCRIPTION OF THE REFERENCE NUMERALS IN THE DRAWINGS

100: Scale plate
110: Hole cup aiming reference line
120: Left and right slope angle indication scale
200: Left and right slope angle indication needle
210: Position identification scale
220: First rotation pin
300: Indication needle rotation means
310: First rotation cam
311: Wedge pin
320: Angle adjustment bar
321: Handle
330: First supporting rod
400: Vertical slope angle scale means
410: Second rotation cam
411: Vertical slope angle indication scale
412: Second rotation pin
420: Second supporting rod
421: Vertical slope angle reference line
500: Lid All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A direction indication device for golf putting, the device comprising:
    a scale plate provided with a hole cup aiming reference line serving as a reference when aiming at a hole cup, a left and right slope angle indication scale indicating a range of left and right slope angles, and a hole in its center;
    a left and right slope angle indication needle formed in a direction indication needle shape to indicate a direction by combining with the hole;
    an indication needle rotation means allowing the left and right slope angle indication needle to rotate to indicate the left and right slope angle indication scale;
    a vertical slope angle scale means provided on the scale plate to indicate a vertical slope angle of a putting green; and
    a lid provided over the scale plate, wherein the indication needle rotation means includes:
    a first rotation cam including a wedge pin closely coupled vertically to an elongated hole formed on one end of the left and right slope angle indication needle and maintained vertically in a direction of the central axis of the earth;
    an angle adjustment bar rotatably connected with the first rotation cam such that the first rotation cam is rotated from side to side and moves back and forth; and
    a first supporting rod to support the angle adjustment bar and installed on the scale plate.

2. The device of claim 1, wherein the left and right slope angle indication needle further includes position identification scale marked to allow a distance between the center of the scale plate and the first rotation cam to be identified.

3. The device of claim 1, wherein the wedge pin is formed in a shape of a circular sphere at an end thereof and allows the left and right slope angle indication needle to move without clearance by being brought into close contact with the elongated hole formed on one side of the left and right slope angle indication needle when the first rotation cam rotates from side to side.

4. The device of claim 1, wherein the angle adjustment bar further includes a handle at one end thereof to move the angle adjustment bar back and forth.

5. The device of claim 1, wherein the vertical slope angle scale means further includes:
   a second rotation cam rotatable up-and-down and maintained vertically in the direction of the central axis of the earth; and
   a second supporting rod to support the second rotation cam and having a mark showing a vertical slope angle reference line.

6. The device of claim 5, wherein the second rotation cam further includes a vertical slope angle indication scale indicating a vertical slope angle on a circumferential surface of an upper circular arc thereof.

7. The device of claim 1, wherein the lid is made of a transparent material to allow the scale plate to be visually confirmed.

\* \* \* \* \*